United States Patent
Mai et al.

(10) Patent No.: US 8,586,251 B2
(45) Date of Patent: Nov. 19, 2013

(54) FUEL CELL SYSTEM

(75) Inventors: Andreas Mai, Constance (DE); Dirk Haberstock, Kandelburg (DE); Roland Denzler, Weisslingen (CH); Josef Sfeir, Buelach (CH)

(73) Assignee: Hexis AG, Winterthur (CH)

( * ) Notice: Subject to any disclaimer, the term of this patent is extended or adjusted under 35 U.S.C. 154(b) by 201 days.

(21) Appl. No.: 13/019,096

(22) Filed: Feb. 1, 2011

(65) Prior Publication Data

US 2011/0200894 A1 Aug. 18, 2011

(30) Foreign Application Priority Data

Feb. 12, 2010 (EP) .................................... 10153483

(51) Int. Cl.
*H01M 8/00* (2006.01)

(52) U.S. Cl.
USPC .......................................... 429/410; 429/400

(58) Field of Classification Search
USPC .................. 429/410, 400, 415, 417, 452, 456
See application file for complete search history.

(56) References Cited

U.S. PATENT DOCUMENTS

| 2005/0142398 A1 | 6/2005 | Browall et al. |
| 2008/0047826 A1 | 2/2008 | Lin et al. |
| 2009/0148743 A1* | 6/2009 | Day et al. ......................... 429/33 |
| 2011/0269059 A1* | 11/2011 | Mukerjee ....................... 429/535 |

FOREIGN PATENT DOCUMENTS

| DE | 199 26 751 C1 | 8/2000 |
| DE | 10 2006 031 863 A1 | 1/2008 |
| WO | WO 2007/093148 A1 | 8/2007 |

* cited by examiner

*Primary Examiner* — Mark F Huff
*Assistant Examiner* — Monique Wills
(74) *Attorney, Agent, or Firm* — Kilpatrick Townsend & Stockton LLP

(57) ABSTRACT

A fuel cell system (1) having a cell stack (2) for the carrying out of electrochemical reactions is provided which is provided with inlets (3a, 3b) for an oxidant (5) and for fuel gas (6) and with outlets (4a, 4b) for exhaust gases (7a, 7b). The fuel cell system (1) additionally includes an apparatus (10) having a gas-permeable structure which contains a substance which reacts with gaseous chromium species, wherein the apparatus is in communication with at least one of the outlets to direct exhaust gases through the apparatus and to separate chromium species which are carried along by the exhaust gases.

19 Claims, 2 Drawing Sheets

FUEL CELL SYSTEM

CROSS REFERENCE TO RELATED APPLICATIONS

Figure 1:
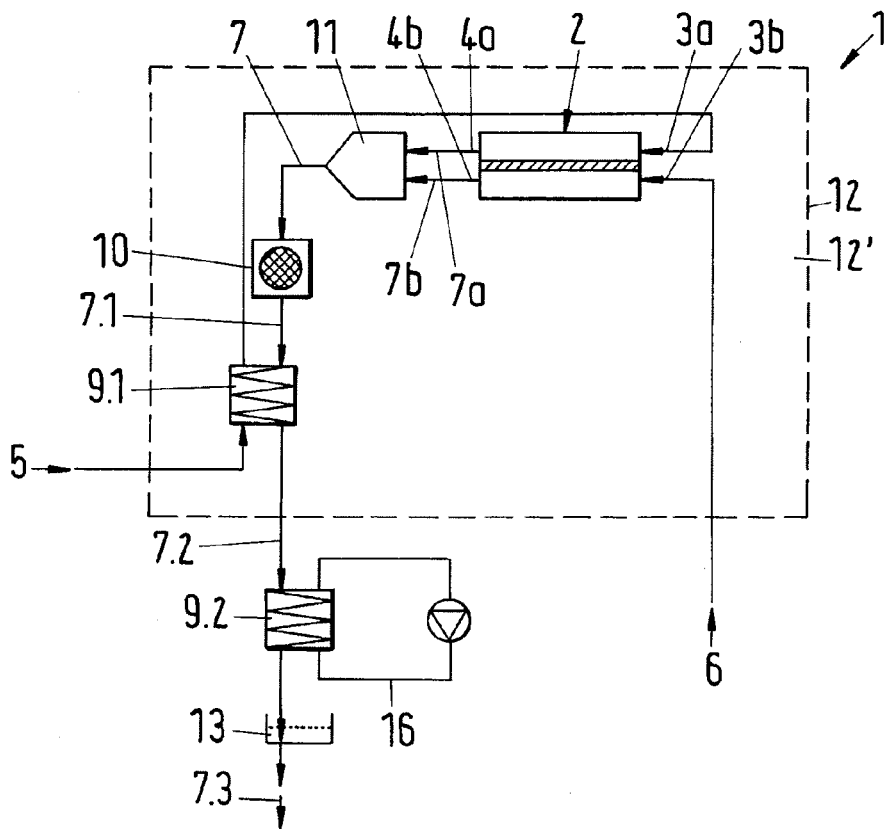

This application claims the priority of European Application No. 10 153 483.2, filed on Feb. 12, 2010, the disclosure of which is incorporated herein by reference.

The invention relates to a fuel cell system in accordance with the preamble of claim 1 and to an apparatus and to a method for fuel cell systems in accordance with the preamble of claim 7 or with the preamble of claim 12 respectively.

A typical fuel cell system is known from document EP 1 037 296 A1. In this fuel cell system, the cells form a cylindrical cell stack at whose periphery an afterburning is carried out in axially aligned chambers, with an exhaust gas of around 1,000° C. arising. Inlet positions are located between the afterburning chambers through which preheated process air (briefly: air) for current-delivering electrochemical reactions is supplied to the cells. A fuel gas is distributed over the cells via an axial passage at the center of the stack.

A fuel cell system as a rule includes a stack having planar cells in which plate-shaped interconnectors, also called bipolar plates, and electrochemically active disks are alternately arranged. The electrochemically active disks each contain at least three layers, namely a positive electrode, an electrolyte, for example a solid electrolyte and a negative electrode, so that the electrochemically active disks are also called PEN elements. The interconnectors, on the one hand, connect contacts between the electrodes of adjacent PEN elements and, on the other hand, contain passages to supply fuel gas and oxidant for the electrochemical reaction to the PEN elements.

The above-described planar cell concept allows short connections with low resistance by the serial connection of electrodes, electrolytes and bipolar plates in the stack. The resistive losses of the elements connected in series can thereby be kept low. Temperature-resistant materials are typically used for the bipolar plates which can achieve the required long-term stability of >40,000 hours. In operation of the cell stack at temperatures of 600° to 1,000° C., electrically conductive, metallic materials with at least 15% chromium portion have proved themselves. These materials are protected against corrosion from the operating gases by the formation of a compact chromium oxide layer which forms in accordance with thermodynamics in the air and gas atmospheres in operation. Since chromium oxide has a sufficient electrical conductivity, the absolutely necessary electrical current flow through the stack is not impeded.

It is, however, also known that, in accordance with thermodynamics, gaseous chromium species can form over a solid chromium oxide layer in atmospheres which contain oxygen and/or water vapor, for example due to the following reactions:

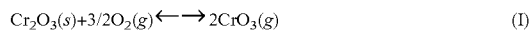  (I)

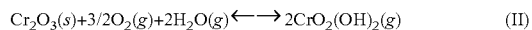  (II)

These chromium species can in turn impair the function of the (positive) electrode at the oxygen side, also called the cathode, in the long term. The impairment of the cathode could, however, be reduced by a protective layer which is applied to the cathode side of the bipolar plate and which prevents the contact of water vapor with the chromium oxide layer.

With longer operating times (>1,000 hours), it has, however, been shown that significant quantities of chromium (total content 5 mg/l) can be detected in the exhaust gas condensate of the system. Approximately 50% of this total content is present as hexavalent chromium. The hexavalent chromium represents a hazard for the environment and results in complex and/or expensive measures in operation and in the servicing and waste disposal of the system. The condensate in this case must be treated with special care to avoid any danger to persons and the environment. The source for the chromium contamination can be found in the metallic materials which contain Cr and which are used in the bipolar plates and also in further parts such as heat exchangers, afterburners and pipe system. The protective layers against the liberation of gaseous chromium species tried and tested on the cathode side admittedly contribute to a reduction in the quantity of the chromium, but as a rule are not sufficient to prevent the danger arising from the hexavalent chromium in the exhaust gas and in the exhaust gas condensate.

It is the object of the invention to provide a fuel cell system and an apparatus and a method for fuel cell systems with which the chromium content in the exhaust gas and in the exhaust gas condensate of the fuel cell system can be reduced.

This object is satisfied in accordance with the invention by the fuel cell system defined in claim 1, by the apparatus defined in claim 7 and by the method defined in claim 12.

The fuel cell system in accordance with the invention contains a cell stack for the carrying out of electrochemical reactions which is provided with inlets for an oxidant and/or a carrier gas and for fuel gas and/or water vapor and with outlets for exhaust gases. The fuel cell system additionally includes at least one apparatus having a gas-permeable structure, such as a porous or honeycomb structure, which contains a substance which reacts with gaseous chromium species or which is provided with such a substance, wherein the apparatus is in communication with at least one of the outlets to direct exhaust gases through the apparatus and to separate chromium species which are carried along by the exhaust gases.

The term "exhaust gases" is given a wide interpretation in the following and includes all gaseous substances which are output by the cell stack or by other components of the fuel cell system such as an afterburner. Depending on the respective application, the exhaust gases can contain reaction products of the electrochemical reaction running in the cell stack, for example $CO_2$, $CO$, $H_2O$, $H_2$ or $O_2$, or unconverted portions of the oxidant, carrier gas, fuel gas or supplied water vapors.

The gas-permeable structure of the apparatus is advantageously solid and can be formed from metal surfaces which are coated with the substance or can be manufactured from ceramic foam which contains the substance or which is made from an inert ceramic material which is coated with the substance.

The substance reacting with gaseous chromium species in particular includes solid substances which spontaneously react with gaseous chromium species at reaction temperatures of typically 400° C. to 1000° C. The substance reacting with gaseous chromium species can, for example, be a carbonate or oxide of one of the elements Mg, Ca, Sr, Ba, Sc, Y, La as well as lanthanoids or a mixed oxide of at least two of the elements Mg, Ca, Sr, Ba, Sc, Y, La as well as lanthanoids or an oxide ceramic with a perovskite structure.

The apparatus is advantageously made in a closed construction apart from connectors. The apparatus is typically arranged outside the cell stack.

In an advantageous embodiment, the fuel cell system additionally includes an afterburner to combust fuel gas which is contained in the exhaust gas and which was not converted in the fuel stack, with the apparatus being able to be arranged after the afterburner.

In a further advantageous embodiment, the outlets for exhaust gases which contain unconverted fuel gas are connected via a branch and an additional apparatus to a fuel gas feed of the cell stack to recirculate water vapor and unconverted fuel gas, wherein the additional apparatus includes a gas-permeable structure, for example a porous or honeycomb structure, which contains a substance which reacts with gaseous chromium species or which is provided with such a substance.

In a further advantageous embodiment, the fuel cell system additionally includes a heat insulation which surrounds the cell stack and optionally an afterburner and/or other burner of the fuel cell system, wherein the single or plural apparatus is/are expediently arranged within the heat insulation.

The apparatus in accordance with the invention for fuel cell systems which contain a cell stack for the carrying out of electrochemical reactions which is provided with inlets for an oxidant and/or a carrier gas and for fuel gas and/or water vapor and with outlets for exhaust gases includes a gas-permeable structure, for example a porous or honeycomb structure, which contains a substance which reacts with gaseous chromium species, or which is provided with such a substance, wherein the apparatus can be coupled to at least one of the outlets of the cell stack or to an afterburner of the fuel cell system to direct exhaust gases through the apparatus and to separate chromium species which are carried along by the exhaust gases.

The gas-permeable structure of the apparatus is advantageously solid and can be formed from metal surfaces which are, for example, arranged in honeycomb form and which are coated with the substance or can be manufactured from ceramic foam which contains the substance or which is made from an inert ceramic material such as $Al_2O_3$ which is coated with the substance.

The gas-permeable structure is advantageously porous and has a pore distribution of 10-20 pores per inch (ppi). The number of pores is set forth on a linear axis in this respect. A corresponding classification can be found, for example, in the ASTM standard D 3576-77.

The substance reacting with gaseous chromium species can, for example, be a carbonate or oxide of one of the elements Mg, Ca, Sr, Ba, Sc, Y, La as well as lanthanoids or a mixed oxide of at least two of the elements Mg, Ca, Sr, Ba, Sc, Y, La and lanthanoids or an oxide ceramic with a perovskite structure. Oxide ceramics having a perovskite structure have the composition $ABO_3$. The A position in the structure can be adopted by the elements Mg, Ca, Sr, Ba and Sc, Y, La and lanthanoids. Around 50 different elements are known for the B position. The B position is typically occupied, for example, by Ti, Zr, V, Nb, Mn, Fe or Co. The A or B positions can each also be occupied by two different elements. Such crystals are called mixed crystals.

The apparatus is advantageously made in a closed construction apart from connectors. The gas-permeable structure can for this purpose, for example, be arranged in a tube or in a leadthrough or opening of the fuel cell system.

In the method in accordance with the invention for fuel cell systems which contain a cell stack for the carrying out of electrochemical reactions which is provided with inlets for an oxidant and/or a carrier gas and for fuel gas and/or water vapor and with outlets for exhaust gases, an electrochemical reaction is carried out in the cell stack and exhaust gas is generated. The method is characterized in that exhaust gas is directed from the cell stack through an apparatus, in particular through one of the above-described apparatus, which includes a gas-permeable structure, for example a porous or honeycomb structure, which contains a substance which reacts with gaseous chromium species or which is provided with such a substance, and in that chromium species are separated in the apparatus which are carried along by the exhaust gases. The separated chromium species expediently include hexavalent chromium compounds.

In an advantageous embodiment of the method, the electrochemical reaction is current-producing, wherein a fuel gas and an oxidant are supplied to the cell stack and wherein the exhaust gas from the cell stack is supplied to the apparatus directly or via an afterburner.

In a further advantageous embodiment of the method, the electrochemical reaction is hydrolysis, wherein water vapor and a carrier gas as well as current are supplied to the cell stack.

The fuel cell system and the apparatus and the method for fuel cell systems in accordance with the present invention have the advantage that the chromium separated from the exhaust gas is present in bound form in a solid substance which can be disposed of safely.

The above description of embodiments and embodiment variants only serves as an example. Further advantageous embodiments can be seen from the dependent claims and from the drawing. Furthermore, individual features from the embodiments and variants described or shown can also be combined within the framework of the present invention to form new embodiments.

Figure 2:
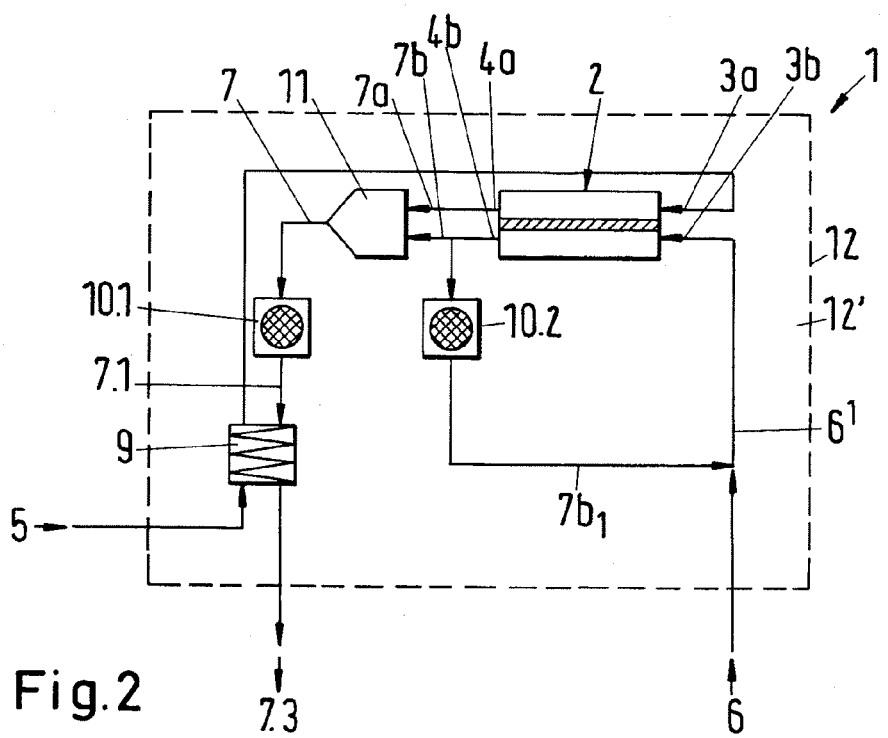
Figure 3:
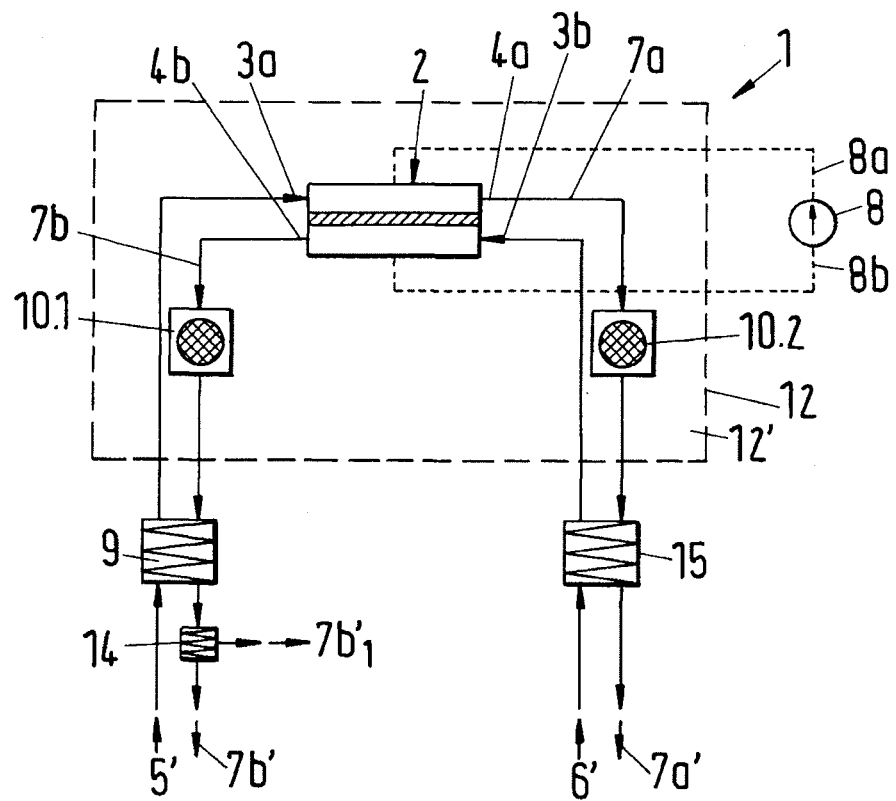
Figure 4:
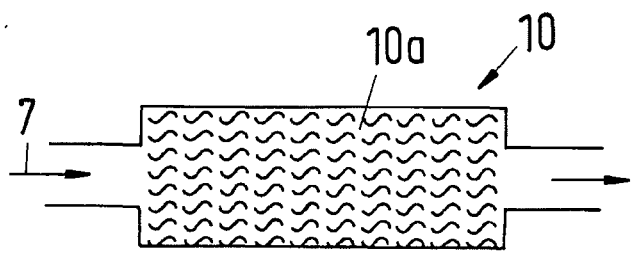

The invention will be explained in more detail in the following with reference to the embodiments and to the drawing. There are shown:

FIG. 1 an embodiment of a fuel cell system in accordance with the present invention;

FIG. 2 a second embodiment of a fuel cell system in accordance with the present invention;

FIG. 3 a third embodiment of a fuel cell system in accordance with the present invention; and FIG. 4 an embodiment of an apparatus for a fuel cell system in accordance with the present invention.

FIG. 1 shows an embodiment of a fuel cell system in accordance with the present invention. The shown fuel cell system 1 contains a cell stack 2 for the carrying out of electrochemical reactions which is provided with inlets 3a, 3b for an oxidant 5, such as air, for example, and for fuel gas 6, such as a hydrocarbon, and with outlets 4a, 4b for exhaust gases 7a, 7b. The fuel cell system 1 additionally includes at least one apparatus 10 having a gas-permeable structure, such as a porous or honeycomb structure, which contains a substance which reacts with gaseous chromium species or which is provided with such a substance, wherein the apparatus is in communication with at least one of the outlets 4a, 4b to direct exhaust gases 7, 7a, 7b through the apparatus and to separate chromium species which are carried along by the exhaust gases.

In an advantageous embodiment, the fuel cell system 1 additionally includes an afterburner 11 to combust fuel gas which is contained in the exhaust gas and which was not converted in the cell stack 2. The exhaust gases containing fuel gas are expediently supplied from the outlet 4b and the exhaust gases containing oxidant from the outlet 4a in operation. The apparatus 10 can be arranged before or, as shown in FIG. 1, after the afterburner 11, wherein in this case both the gaseous chromium species from the cell stack 2 and optionally further gaseous chromium species from the afterburner, which are contained in the exhaust gas 7, are directed through the apparatus 10.

In a further advantageous embodiment, the fuel cell system 1 additionally includes a heat insulation 12 which surrounds the cell stack 2 and optionally an afterburner 11 and/or other burner of the fuel cell system, wherein the apparatus 10 is advantageously arranged within the heat insulation.

The cell stack 2 contains so-called high temperature fuel cells in the embodiment, for example solid oxide fuel cells (SOFC), which are typically operated at a temperature from 600° C. to 1,000° C. The exhaust gases 7 at the output of the afterburner 11 can reach a temperature of 1,000° C. in operation. If a heat insulation 12 is used, the temperature in the interior 12' of the heat insulation typically amounts to 500° C.

If necessary, one or more heat exchangers 9.1, 9.2 can be provided in the fuel cell system 1 to utilize the waste heat in the exhaust gas, for example a heat exchanger 9.1 which is arranged in the interior 12' of the heat insulation and through which the exhaust gases 7.1 from the apparatus 10 are directed to heat an oxidant 5, for example, before the feed to the cell stack 2. The heat exchanger 9.1 can, however, also be arranged before the apparatus 10 and can be directly connected to the afterburner 11.

A second heat exchanger 9.2 can furthermore be provided in the fuel cell system 1, as shown in FIG. 1, through which the exhaust gases 7.2 are directed from the first heat exchanger. The second heat exchanger is advantageously arranged outside the heat insulation and can, for example, be connected to a heating circuit 16. The exhaust gases 7.3 from the second heat exchanger are now cooled so much that they can be output to the environment, wherein a condensate tub 13 can be provided as required to collect condensate from the exhaust gas.

To achieve high efficiencies, the fuel cell system can be operated with fuel gas return. In this respect, a portion of the exhaust gas of the cell stack at the anode side which contains unconsumed fuel gas and water vapor is guided directly into the fuel gas flow to achieve a better utilization of the calorific value and to use the water present for the reforming, i.e. treatment, of the supplied fuel gas. Since, however, gaseous chromium species are also carried along from the anode side of the bipolar plates in the exhaust gas flow, the catalyst materials of the reformer are in danger and an impairment of the anodes can occur with high chromium concentrations in the fuel gas.

FIG. 2 shows a second embodiment of a fuel cell system in accordance with the present invention with fuel gas return. The fuel cell system 1 shown in FIG. 2 contains a cell stack 2 for the carrying out of electrochemical reactions which is provided with inlets 3a, 3b for an oxidant 5, such as air, for example, and for fuel gas 6, such as a hydrocarbon for example, and with outlets 4a, 4b for exhaust gases 7a, 7b. The fuel cell system 1 additionally includes at least one apparatus 10.1, 10.2 having a gas-permeable structure, such as a porous or honeycomb structure, which contains a substance which reacts with gaseous chromium species or which is provided with such a substance, wherein the apparatus 10.1, 10.2 is in communication with at least one of the outlets 4a, 4b to direct exhaust gases 7, 7a, 7b through the apparatus and to separate chromium species which are carried along by the exhaust gases.

The second embodiment differs from the first embodiment only in that an anode gas return is provided. A repetition of the description of possible embodiment variants and embodiments is therefore omitted in the following and reference is made with respect to possible embodiment variants and embodiments to the above description of the first embodiment.

In the embodiment shown in FIG. 2, the outlets 4b for exhaust gases 7b which contain unconverted fuel gas, i.e., for the exhaust gases at the anode side, are connected via a branch and an additional apparatus 10.2 to a fuel gas feed $6^1$ of the cell stack 2 to recirculate water vapor and unconverted fuel gas. The additional apparatus 10.2 includes a gas-permeable structure, for example a porous or honeycomb structure, which contains a substance which reacts with gaseous chromium species or which is provided with such a substance to direct the exhaust gases 7b which contain unconverted fuel gas through the apparatus and to separate chromium species which are carried along by the exhaust gases 7b. The exhaust gases $7b_1$ treated in this manner are subsequently supplied to the fuel gas feed $6^1$ together with fresh fuel gas.

Fuel cell systems can also be operated as hydrolysis systems, for example as high-temperature hydrolysis systems (reverse SOFC). In hydrolysis operation, the electrochemical cells are charged with a current. The decomposition of water vapor into $H_2$ and $O^{2-}$ takes place on the anode side. $H_2$ and unconsumed $H_2O$ exit the cell at the outlet. The ions migrate through the solid electrolyte to the cathode side where they react to form $O_2$ and are conveyed from the cell by a carrier gas. Gaseous chromium species which, as in the case of normal operation of high temperature fuel cell systems, result in high concentrations of hexavalent chromium in the condensate are formed over alloys containing chromium due to the high water content on the anode side. If air is used as the carrier gas, the mass flow enriched with $O_2$ also contains gaseous chromium species.

FIG. 3 shows a third embodiment of a fuel cell system in accordance with the present invention for hydrolysis operation. The fuel cell system 1 shown in FIG. 3 contains a cell stack 2 for the carrying out of electrochemical reactions which is provided with inlets 3a, 3b for a carrier gas 5', such as air, for example, and for water vapor 6' and with outlets 4a, 4b for exhaust gases 7a, 7b. The exhaust gases 7a, 7b preferably contain carrier gas+$O_2$ or $H_2$+water vapor in operation. The fuel cell system 1 additionally includes at least one apparatus 10.1 having a gas-permeable structure, for example a porous or honeycomb structure which contains a substance which reacts with gaseous chromium species or which is provided with such a substance, wherein the at least one apparatus 10.1 is in communication with the outlet 4b for exhaust gases 7b containing $H_2$ and water vapor to direct the same through the apparatus and to separate chromium species which are carried along by the exhaust gases.

The cell stack 2 in the third embodiment can typically be connected via electrical lines 8a, 8b to an electrical current source 8 to charge the cell stack with current.

The fuel cell system 1 can, as required, additionally include a second apparatus 10.2 having a gas-permeable structure, for example a porous or honeycomb structure which contains a substance which reacts with gaseous chromium species or which is provided with such a substance, wherein the second apparatus 10.2 is in communication with the outlet 4a for exhaust gases containing $O_2$ to direct the same through the apparatus and to separate chromium species which are carried along by the exhaust gases.

In a further advantageous embodiment, the fuel cell system 1 additionally include a heat insulation 12 which surrounds the cell stack 2, wherein the apparatus 10.1, 10.2 are advantageously arranged in the interior 12' of the heat insulation.

If required, one or more heat exchangers 9 can be provided in the fuel cell system 1 to utilize the waste heat in the exhaust gases 7a, 7b, for example a heat exchanger 9 through which exhaust gases 7b containing $H_2$ and water vapor are directed from the apparatus 10.1 to heat a carrier gas 5', for example, before the supply to the cell stack 2. From case to case, a second heat exchanger or evaporator 15 can be provided in the fuel cell system 1, as shown in FIG. 3, through which the exhaust gases 7a containing $O_2$ are directed to evaporate and/or to heat water 6' before the supply to the cell stack 2. The exhaust gases 7a' containing $O_2$ can subsequently be reused without danger industrially or can be output to the environment.

In an advantageous embodiment, the fuel cell system additionally contains, as shown in FIG. 3, a condenser 14 for the exhaust gases 7b containing $H_2$ and water vapor to separate $H_2$, labeled with the reference numeral 7b' in FIG. 3, from the water vapor. The liquid water 7b$_1$' arising in this process is advantageously supplied to the evaporator 15.

FIG. 4 shows an embodiment of an apparatus 10 in accordance with the present invention for fuel cell systems which contain a cell stack for the carrying out of electrochemical reactions which is provided with inlets for an oxidant and/or a carrier gas and for fuel gas and/or water vapor and with outlets for exhaust gases. In the embodiment, the apparatus includes a gas-permeable structure 10a, for example a porous or honeycomb structure which contains a substance which reacts with gaseous chromium species or which is provided with such a substance, wherein the apparatus can be coupled with at least one of the outlets of the cell stack or with an afterburner of the fuel cell system to direct exhaust gases 7 through the apparatus and to separate chromium species which are carried along by the exhaust gases.

The gas-permeable structure of the apparatus is advantageously solid and can be formed from metal surfaces which are, for example, arranged in honeycomb form and which are coated with the substance or can be manufactured from ceramic foam which contains the substance or which is made from an inert ceramic material such as $Al_2O_3$ which was coated with the substance, for example with the help of vacuum filtration. The ceramic foam can be manufactured, for example, in accordance with the so-called replica process. In this process, a PU foam is infiltrated with a ceramic slurry and the excess ceramic slurry is squeezed out. The ceramic slurry is subsequently dried and subjected to a heat treatment. The PU foam burns out during the heat treatment and the ceramic mass from the ceramic slurry is sintered, wherein a positive image of the PU foam arises.

The gas-permeable structure is advantageously porous and has a pore distribution of 10-20 pores per inch [ppi]. The number of pores is set forth on a linear axis in this respect. A corresponding classification can be found, for example, in the ASTM standard D 3576-77.

In an advantageous embodiment variant, the substance reacting with gaseous chromium species can, for example, be a carbonate or oxide of one of the elements Mg, Ca, Sr, Ba, Sc, Y, La as well as lanthanoids or a mixed oxide of at least two of the elements Mg, Ca, Sr, Ba, Sc, Y, La as well as lanthanoids or an oxide ceramic with a perovskite structure. Oxide ceramics having a perovskite structure have the composition $ABO_3$. The A position in the structure can be adopted by the elements Mg, Ca, Sr, Ba and Sc, Y, La and lanthanoids. Around 50 different elements are known for the B position. The B position is typically occupied, for example, by Ti, Zr, V, Nb, Mn, Fe or Co. The A or B positions can each also be occupied by two different elements. Such crystals are called mixed crystals. A typical oxide ceramic with a perovskite structure is, for example, $La_{0.6}Sr_{0.4}CoO_3$ which reacts well with gaseous chromium species.

The apparatus is advantageously made in a closed construction apart from connectors. The gas-permeable structure can for this purpose, for example, be arranged in a tube or in a leadthrough or opening of the fuel cell system. The installation volume of the gas-permeable structure can amount, for example, to 50 $cm^3$, 80 $cm^3$ or more in dependence on the size of the cell stack.

An embodiment of the method for fuel cell systems in accordance with the invention which contain a cell stack for the carrying out of electrochemical reactions which is provided with inlets for an oxidant and/or a carrier gas and for fuel gas and/or water vapor and with outlets for exhaust gases will be described with reference to FIGS. 1, 2 and 3 in the following. An electrical reaction is carried out and exhaust is gas generated in the cell stack 2 in the method. The method is characterized in that the exhaust gas 7, 7a, 7b is directed from the cell stack 2 through an apparatus 10, 10.1, 10.2 which includes a gas-permeable structure, for example, a porous or honeycomb structure, which contains a substance which reacts with gaseous chromium species or which is provided with such a substance, and in that chromium species are separated in the apparatus which are carried along by the exhaust gases 7, 7a, 7b. The separation of the chromium species in the apparatus 10, 10.1, 10.2 typically takes place at a temperature of 450° C. or 500° C. or higher. The separated chromium species expediently include hexavalent chromium compounds.

The exhaust gas 7, 7a, 7b is advantageously directed through one of the apparatus described in the foregoing sections.

In an advantageous embodiment of the method, the electrochemical reaction is current-producing, wherein a fuel gas 6 and an oxidant 5 are supplied to the cell stack 2 and wherein the exhaust gas from the cell stack 2 is supplied to the apparatus 10, 10.1, 10.2 directly or via an afterburner 11.

In a further advantageous embodiment of the method, the electrochemical reaction is hydrolysis, wherein water vapor 6' and a carrier gas 5' as well as current are supplied to the cell stack 2.

The fuel cell system and the apparatus and the method for fuel cell systems in accordance with the above description have the advantage that the chromium content in the condensate can be lowered by more than 50% with respect to conventional fuel cell systems. It furthermore appears possible on the basis of extrapolations to reach a service life of 40,000 h with the above-described apparatus so that no additional servicing is required for the apparatus.

The invention claimed is:

1. A fuel cell system having a cell stack for the carrying out of electrochemical reactions which is provided with inlets for an oxidant and/or a carrier gas and for fuel gas and/or water vapor and with outlets for exhaust gases, wherein the fuel cell system includes at least one apparatus having a gas-permeable structure which contains a substance which reacts with gaseous chromium species, or which is provided with such a substance, and the apparatus is in communication with at least one of the outlets to direct exhaust gases through the apparatus and to separate chromium species which are carried along by the exhaust gases.

2. A fuel cell system in accordance with claim 1, wherein the gas-permeable structure is formed from metal surfaces which are coated with the substance or is manufactured from ceramic foam which contains the substance or which is made from an inert ceramic material which is coated with the substance.

3. A fuel cell system in accordance with claim 1, additionally including an afterburner to combust fuel gas contained in the exhaust gas which was not converted in the cell stack, with the apparatus being arranged after the afterburner.

4. A fuel cell system in accordance with claim 1, wherein the outlets for exhaust gases which contain unconverted fuel gas are connected via a branch and via an additional apparatus to a fuel gas feed of the cell stack to recirculate water vapor and unconverted fuel gas, and wherein the additional apparatus includes a gas-permeable structure which contains a substance which reacts with gaseous chromium species or which is provided with such a substance.

5. A fuel cell system in accordance with claim 1, wherein the apparatus is made in a closed construction, except for connectors, and/or wherein the apparatus is arranged outside the cell stack.

6. A fuel cell system in accordance with claim 1, additionally including a thermal insulation which surrounds the cell stack, wherein the single or plural apparatus is/are arranged within the thermal insulation.

7. An apparatus for fuel cell systems which contain a cell stack for the carrying out of electrochemical reactions which is provided with inlets for an oxidant and/or a carrier gas and for fuel gas and/or water vapor and with outlets for exhaust gases, wherein the apparatus includes a gas-permeable structure which contains a substance which reacts with gaseous chromium species, or which is provided with such a substance, and the apparatus can be coupled to at least one of the outlets of the cell stack or to an afterburner of the fuel cell system to direct exhaust gases through the apparatus and to separate chromium species which are carried along by the exhaust gases.

8. An apparatus in accordance with claim 7, wherein the gas-permeable structure is formed from metal surfaces which are coated with the substance or is manufactured from ceramic foam which contains the substance or which is made from an inert ceramic material which is coated with the substance.

9. An apparatus in accordance with claim 7, wherein the gas-permeable structure is porous and has a pore distribution of 10-20 pores per inch [ppi].

10. An apparatus in accordance with claim 7, wherein the substance is a carbonate or oxide of one of the elements Mg, Ca, Sr, Ba, Sc, Y, La as well as lanthanoids or a mixed oxide of at least two of the elements Mg, Ca, Sr, Ba, Sc, Y, La and lanthanoids or an oxide ceramic with a perovskite structure.

11. An apparatus in accordance with claim 7, wherein the apparatus is made in a closed construction apart from connectors.

12. A method for fuel cell systems which contain a cell stack for the carrying out of electrochemical reactions which is provided with inlets for an oxidant and/or a carrier gas and for fuel gas and/or water vapor and with outlets for exhaust gases, wherein an electrochemical reaction is carried out in the cell stack and exhaust gas is generated, characterized in that exhaust gas (7a, 7b) from the cell stack is directed through an apparatus in accordance with claim 7, which includes a gas-permeable structure, which contains a substance which reacts with gaseous chromium species, or which is provided with such a substance; and in that chromium species are separated in the apparatus which are carried along by the exhaust gases.

13. A method in accordance with claim 12, wherein the separated chromium species include hexavalent chromium compounds.

14. A method in accordance with claim 12, wherein the electrochemical reaction is current-producing and a fuel gas and an oxidant are supplied to the cell stack, and wherein the exhaust gas from the cell stack is supplied directly to the apparatus or via an afterburner.

15. A method in accordance with claim 12, wherein the electrochemical reaction is hydrolysis and water vapor and a carrier gas as well as current are supplied to the cell stack.

16. A fuel cell system in accordance with claim 1, wherein the gas-permeable structure comprises a porous or honeycomb structure.

17. A fuel cell system in accordance with claim 4, wherein the gas-permeable structure of the additional apparatus comprises a porous or honeycomb structure.

18. An apparatus for fuel cell systems in accordance with claim 7, wherein the gas-permeable structure comprises a porous or honeycomb structure.

19. A method in accordance with claim 12, wherein the gas-permeable structure comprises a porous or honeycomb structure.

* * * * *